US011475585B2

(12) United States Patent
Hsieh et al.

(10) Patent No.: US 11,475,585 B2
(45) Date of Patent: Oct. 18, 2022

(54) ANTENNA ADJUSTMENT DEVICE AND METHOD FOR MOBILE VEHICLE

(71) Applicant: NATIONAL CHIAO TUNG UNIVERSITY, Hsinchu (TW)

(72) Inventors: Yi-Yu Hsieh, Miaoli County (TW); Dong-Lin Li, Taipei (TW); Kuan-Wen Chen, Yilan County (TW); Jen-Hui Chuang, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 362 days.

(21) Appl. No.: 16/845,050

(22) Filed: Apr. 9, 2020

(65) Prior Publication Data
US 2020/0327688 A1 Oct. 15, 2020

(30) Foreign Application Priority Data
Apr. 12, 2019 (TW) .................................. 108112863

(51) Int. Cl.
*G06T 7/593* (2017.01)
*H04B 7/185* (2006.01)
*H01Q 1/28* (2006.01)

(52) U.S. Cl.
CPC ............... *G06T 7/593* (2017.01); *H01Q 1/28* (2013.01); *H04B 7/18506* (2013.01)

(58) Field of Classification Search
None
See application file for complete search history.

(56) References Cited

U.S. PATENT DOCUMENTS

| 9,537,561 | B1 | 1/2017 | Kotecha et al. | |
|---|---|---|---|---|
| 2012/0235863 | A1 | 9/2012 | Erdos et al. | |
| 2017/0063443 | A1 | 3/2017 | Jalali et al. | |
| 2017/0163336 | A1 | 6/2017 | Jalali et al. | |
| 2017/0168481 | A1* | 6/2017 | Flanigan | G05D 1/0022 |
| 2017/0329351 | A1* | 11/2017 | Park | A01B 79/005 |
| 2018/0019516 | A1* | 1/2018 | Teague | B64D 43/00 |
| 2020/0119434 | A1* | 4/2020 | Li | G05D 1/0094 |
| 2020/0244346 | A1* | 7/2020 | Goettle | H04B 7/0408 |

FOREIGN PATENT DOCUMENTS

| TW | 573381 | B | 1/2004 | |
|---|---|---|---|---|
| TW | I361517 | B | 4/2012 | |
| TW | I482362 | B | 4/2015 | |
| TW | 201817254 | A | 5/2018 | |
| WO | WO-2020139369 | A1 * | 7/2020 | ............ H01Q 1/28 |

* cited by examiner

*Primary Examiner* — Ajit Patel
(74) *Attorney, Agent, or Firm* — CKC & Partners Co., LLC

(57) ABSTRACT

An antenna adjustment device and an antenna adjustment method for a mobile vehicle, in which main structure includes the mobile vehicle having a directional antenna, a photographic element and an epipolar line analysis component. The epipolar line analysis component establishes data connection with the directional antenna and the photographic element. The photographic element includes a photographic part and an image receiving processing part. With the above structure, the user can use the photographic element with the directional antenna to define an epipolar line of optimal connection efficiency with the base station on the image receiving processing part. When the connection is needed, the mobile vehicle is moved for adjusting an image of the base station imaged by the image receiving processing part to align to the epipolar line, so as to get the optimal connection efficiency.

10 Claims, 16 Drawing Sheets

ANTENNA ADJUSTMENT DEVICE AND METHOD FOR MOBILE VEHICLE

RELATED APPLICATIONS

This application claims priority to Taiwan Application Serial Number 108112863, filed Apr. 12, 2019, which is herein incorporated by reference.

BACKGROUND

Field of Invention

The present invention relates to antenna adjustment device and method for a mobile vehicle, and more particularly, antenna adjustment device and method for a mobile vehicle with an energy saving effect and an improved transmission effect.

Description of Related Art

The communication quality between the mobile vehicle and the base station is very important. If the communication quality is too poor, a long time transmission or even an error or failure will occur when large data such as video or streaming real-time data are transmitted, which causes an unnecessary burden on the power of the mobile vehicle, thereby affecting the endurance of the mobile vehicle itself or other driving abnormalities of other components.

The main steps for establishing wireless transmission are to first confirm the interference level of all communication spectrums in the current location by means of frequency sweeping, and then establish a wireless transmission channel with the best communication frequency band. However, the frequency sweep method consumes considerable energy and cannot find the optimal transmission line connecting the mobile vehicle antenna and the base station. Therefore, some scholars have proposed a method of establishing the best communication channel with a base station at the current stage by using a directional array antenna through beamforming technology to improve transmission power.

In practical applications, when the directional antenna is connected to the base station via beamforming, the orientation of the antenna may not be optimally adjusted toward the direction of the base station, for highest signal strength, although the locally best transmission effect in the current state has been achieved. It affects energy conversion efficiency and causes more energy consumption. If it is applied to a mobile vehicle that can move in the position and direction, it will cause unnecessary energy loss and affect the endurance of the vehicle.

Therefore, in order to solve the above problems and deficiencies in the above-mentioned manner, the inventors of the present disclosure and those involved in the industry are eager to study the direction of improvement.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

The inventors of the present disclosure have collected the relevant materials in view of the above-mentioned deficiencies of the related art. An antenna adjustment device and an antenna adjustment method for a mobile vehicle with an improved transmission effect and an energy saving effect have been designed.

The main object of the present disclosure is to adjust the direction of the directional antenna via the photographic element, so as to achieve better communication transmission efficiency and to save energy. The directional antenna can be an array of antenna elements each has a wide angular range of transmission so that beamforming can be performed or a single element of directional antenna which has a narrow angular range of transmission.

In order to achieve the above object, the main structure of the present disclosure includes a mobile vehicle, a directional antenna disposed on the mobile vehicle, a photographic element disposed on the mobile vehicle and an epipolar line analysis component disposed on the mobile vehicle. The epipolar line analysis component establishes optimal data connection with both the directional antenna and the photographic element. The photographic element includes a photographic part and an image receiving processing part. The photographic part can capture an image, and the image receiving processing part can receive the image captured by the photographic part.

With the above structure, the user can reorient the directional antenna together with the photographic element disposed on the mobile vehicle toward a connectable base station at a short distance till the directional antenna establishes optimal data connection with the base station, and mark the first position of the base station on the image captured by the photographic part of the photographic element indicating optimal signals are obtained. Then, the mobile vehicle is moved gradually away from the base station, during which two additional positions of the base station are also marked on the captured images to indicate optimal signals obtained for two other distances between the directional antenna and the base station. The three image positions of the base station are then transmitted to the epipolar line analysis component, and the epipolar line analysis component generates an epipolar line fitting the above three positions of base station in a reference image. The epipolar line gives preferred image locations of base station of optimal connection efficiency for various distances of the directional antenna from the base station. The epipolar line is then transmitted to an image receiving processing part. When the directional antenna needs to get the optimal connection efficiency from a specific distance of the base station, the mobile vehicle is reoriented to adjust image of the base station imaged by the image receiving processing part to the corresponding location of the epipolar line, which means that the directional antenna are properly pointed toward the base station for the optimal connection efficiency, so as to increase the efficiency of data transmission.

With the above technology, the present disclosure can solve the problem that the conventional antenna cannot be adjusted for the optimal transmission direction toward the base station to save transmission energy.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
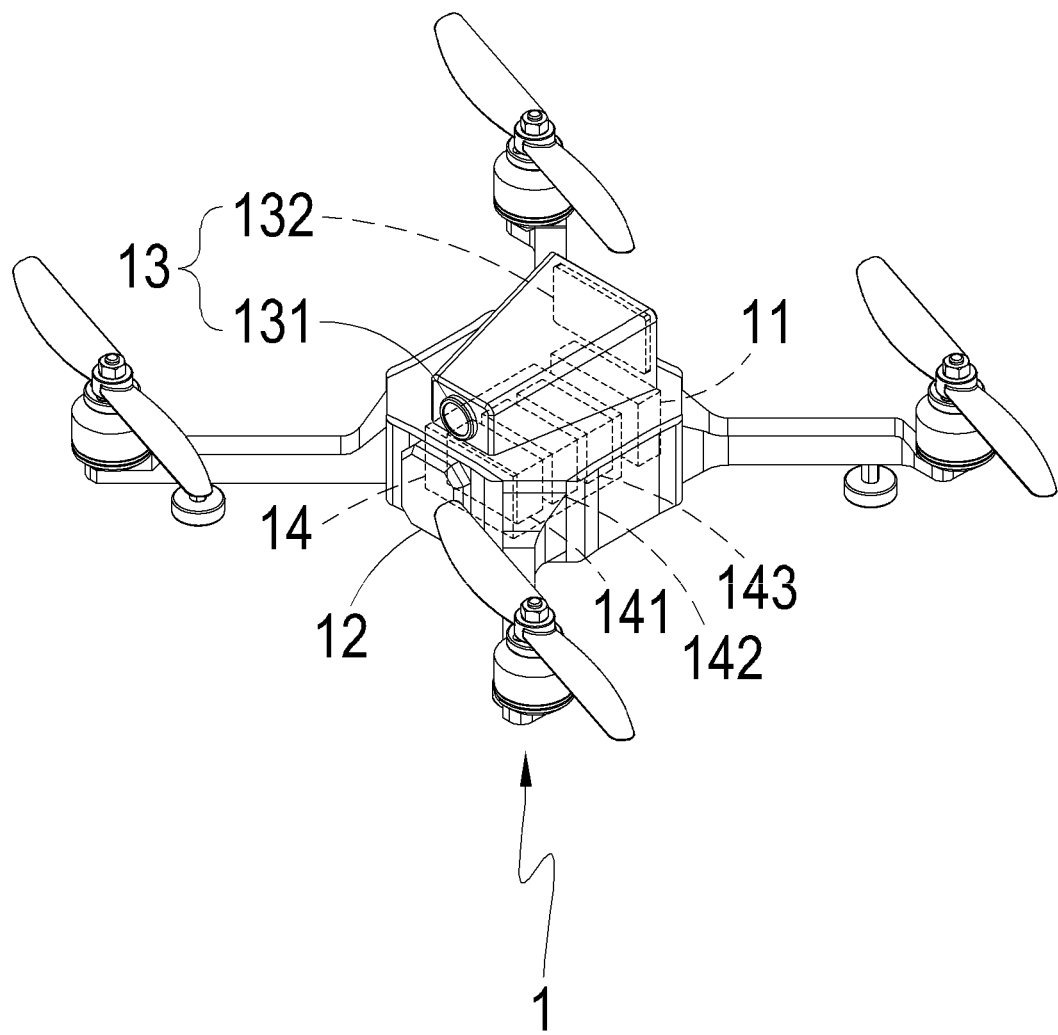
FIG. 1 is a perspective view of one embodiment of the present disclosure.
Figure 2:
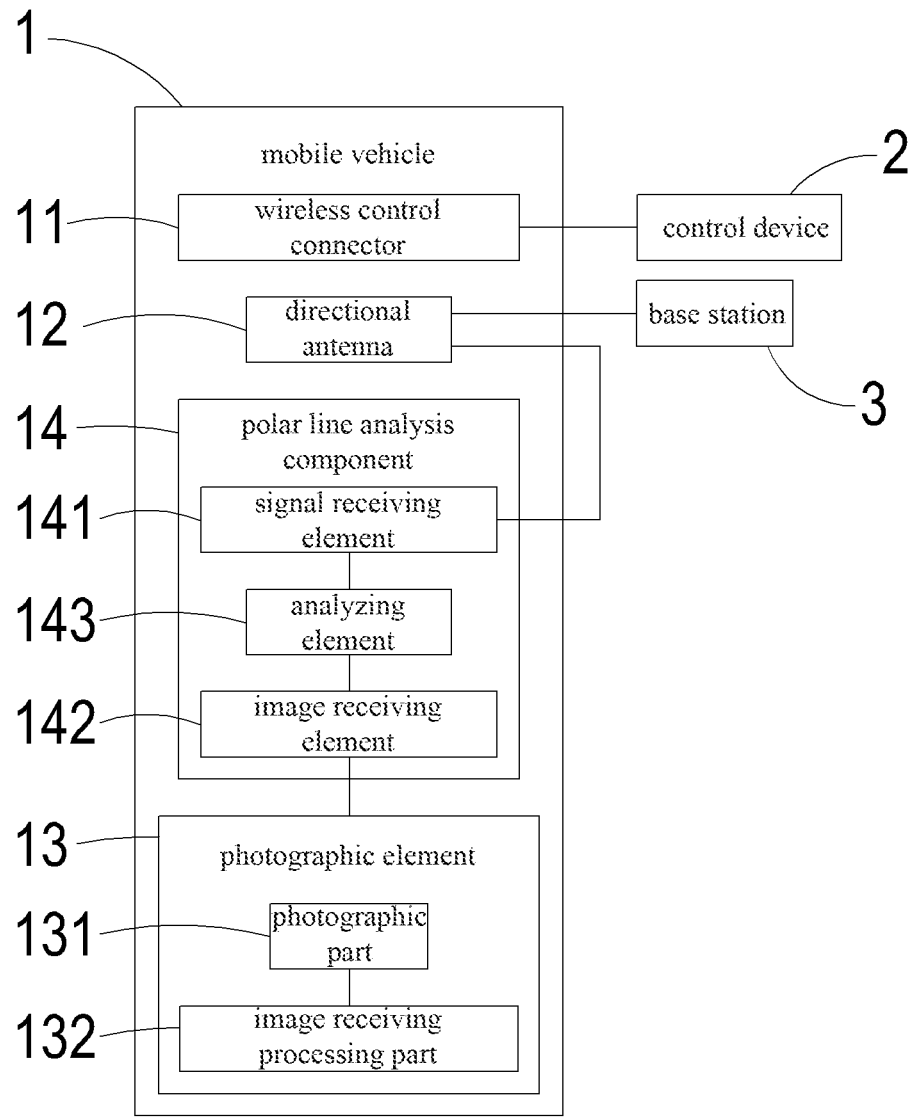
FIG. 2 is a block diagram of one embodiment of the present disclosure.
Figure 3:
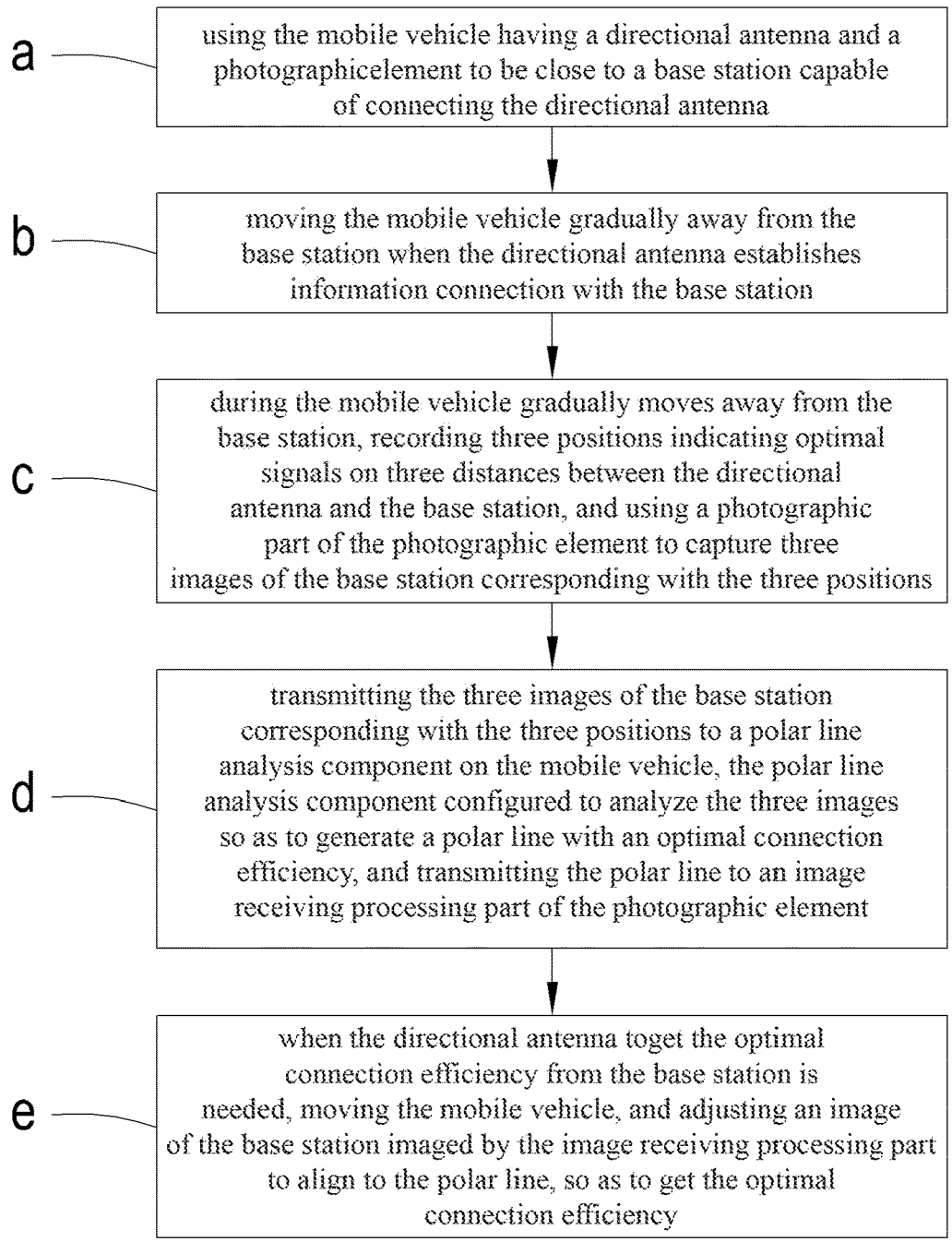
FIG. 3 is a schematic diagram of the steps of one embodiment of the present disclosure.
Figure 4:
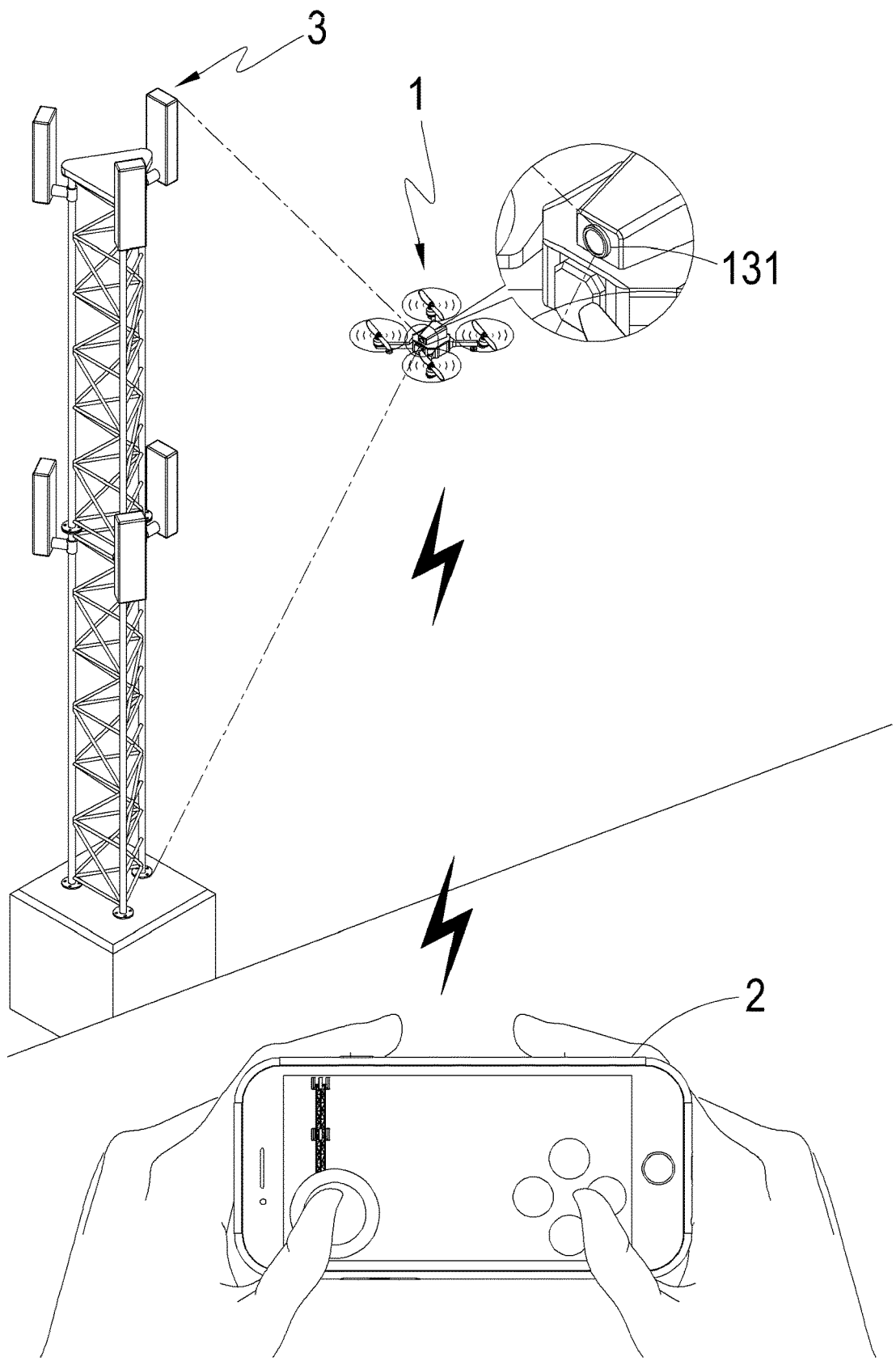
FIG. 4 is a schematic diagram (1) of an adjustment of one embodiment of the present disclosure.
Figure 5:
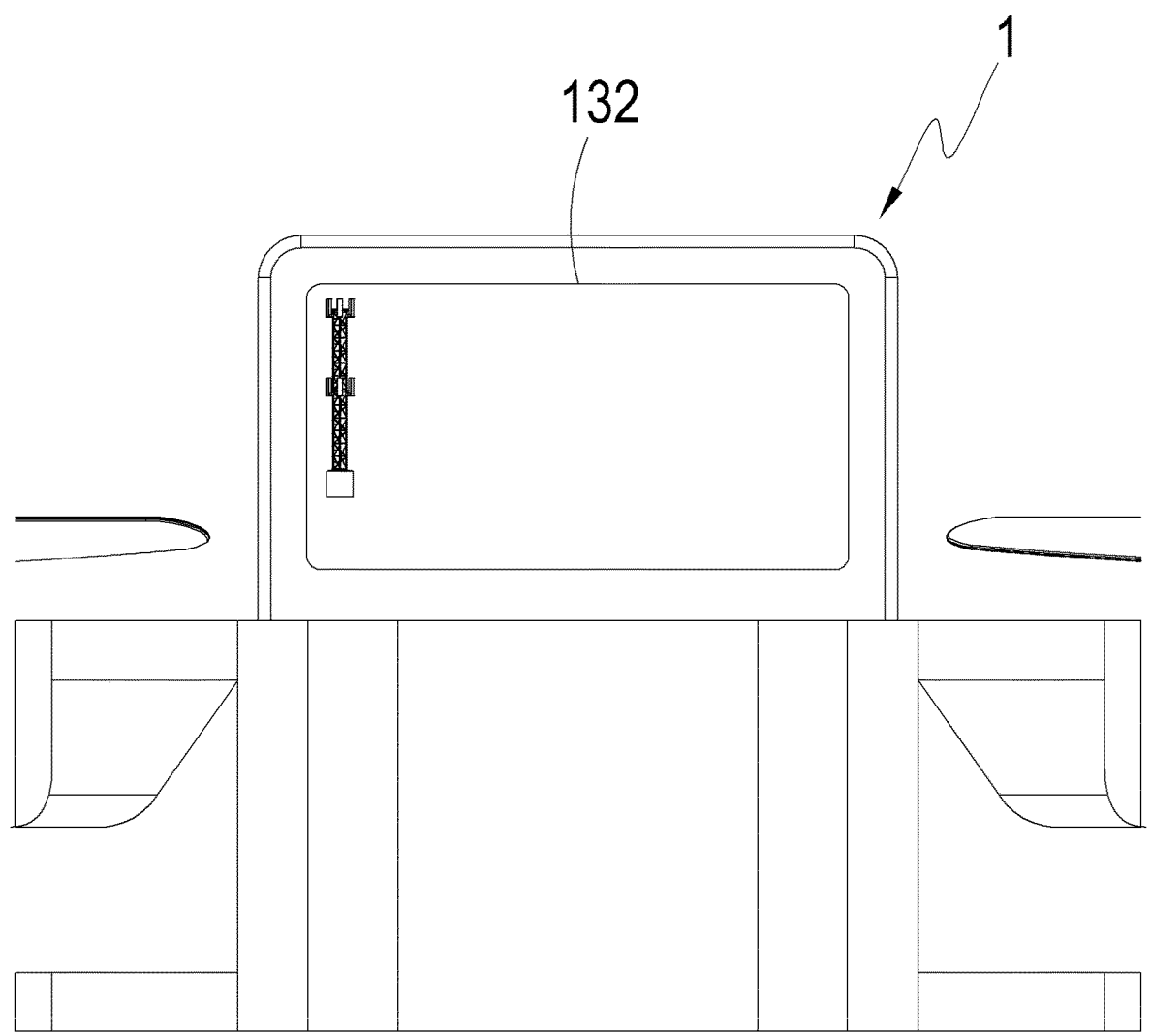
FIG. 5 is a schematic diagram (1) of a view of one embodiment of the present disclosure.
Figure 6:
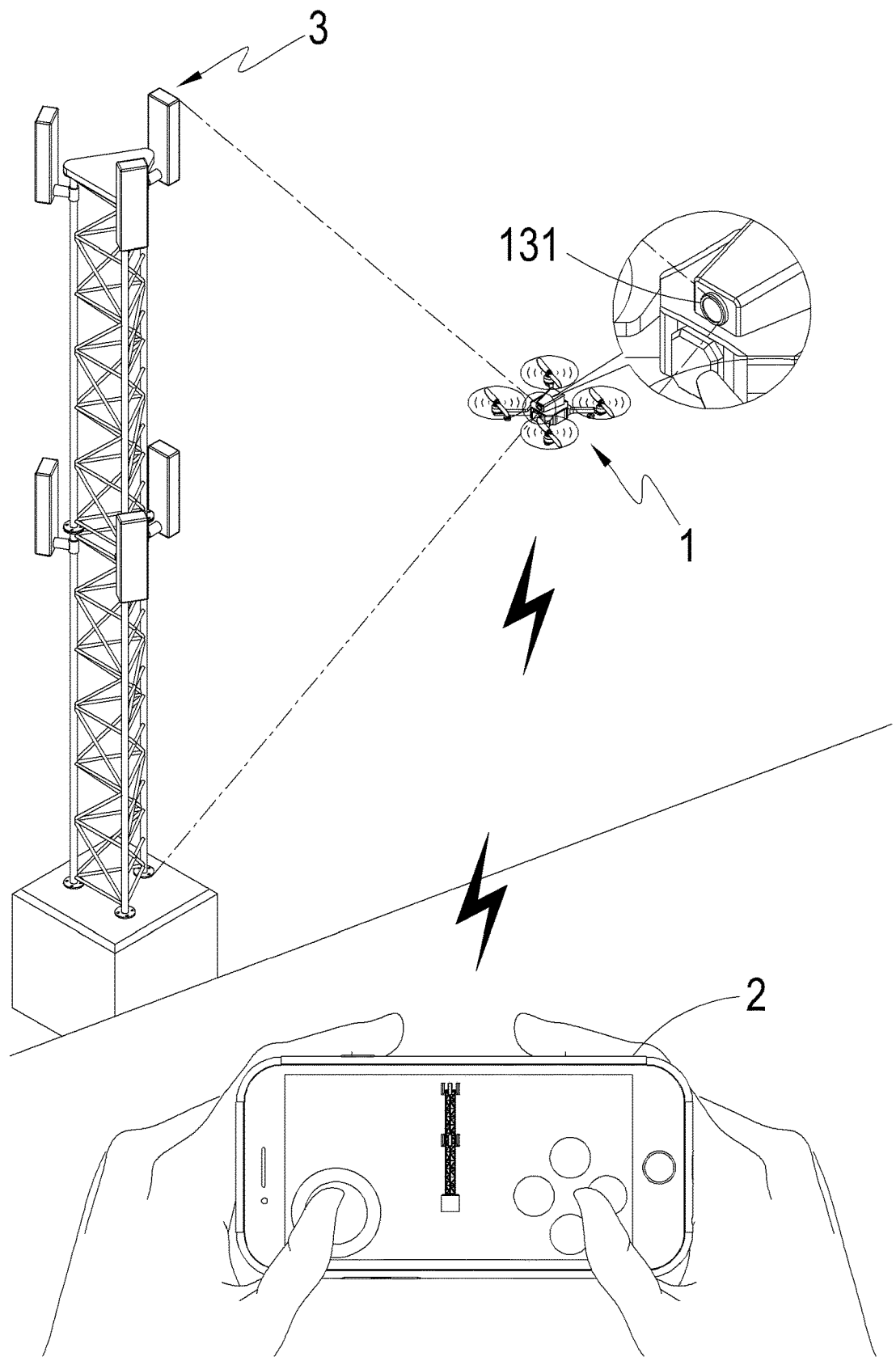
FIG. 6 is a schematic diagram (2) of an adjustment of one embodiment of the present disclosure.
Figure 7:
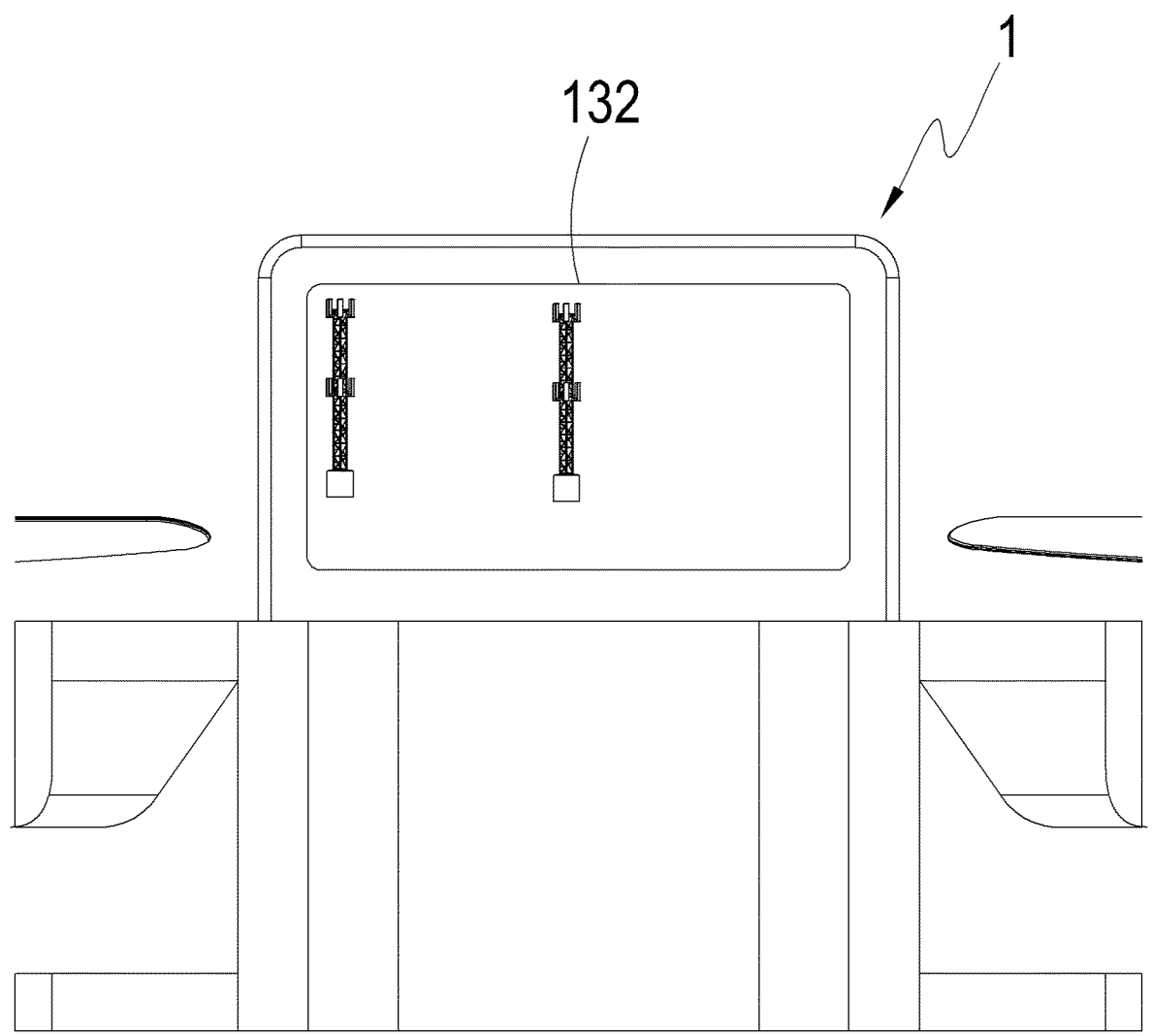
FIG. 7 is a schematic diagram (2) of a view of one embodiment of the present disclosure.
Figure 8:
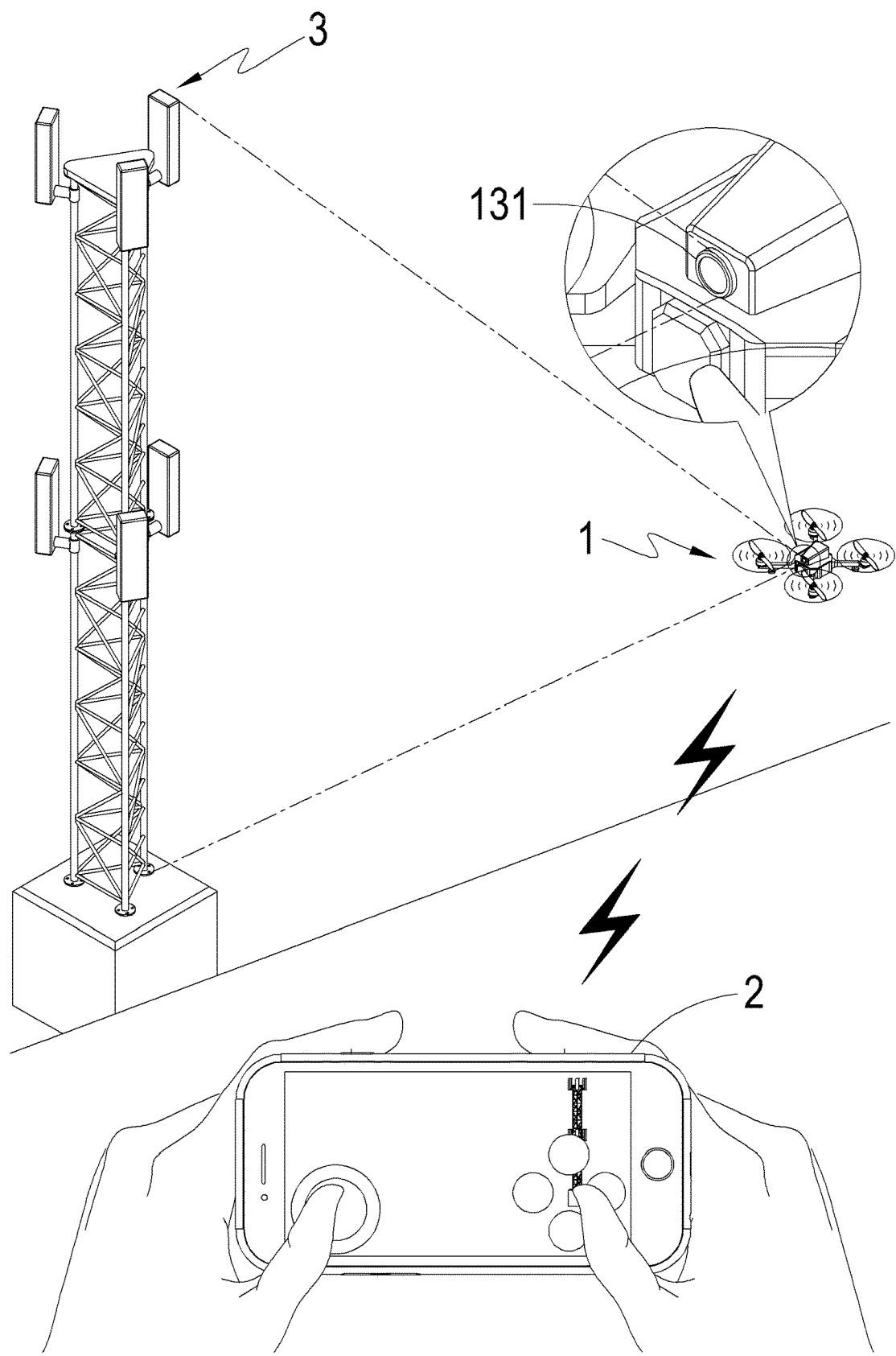
FIG. 8 is a schematic diagram (3) of an adjustment of one embodiment of the present disclosure.
Figure 9:
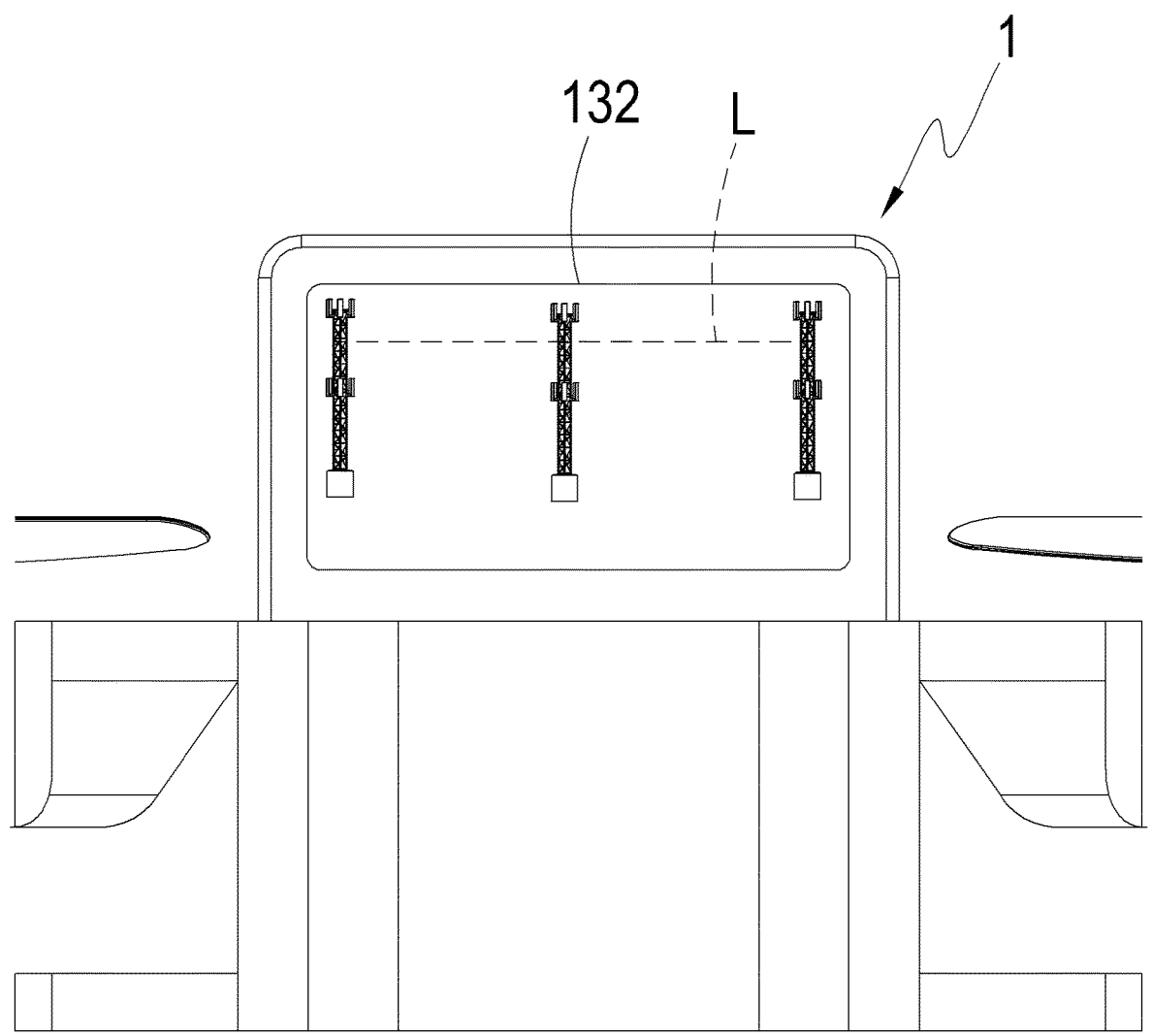
FIG. 9 is a schematic diagram (3) of a view of one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring to FIGS. 1 to 10, they show a perspective view to a schematic diagram (4) of one embodiment of the present disclosure. As shown in these figures, the present disclosure includes features as follow.

A mobile vehicle 1 can be a drone for example in one embodiment, but the present disclosure is not limited thereto. The mobile vehicle 1 has a wireless control connector that can be wirelessly connected to a control device 2 of a user, so that the control device 2 can control the movement of the mobile vehicle 1. For example, the control device 2 can be a mobile phone, but the present disclosure is not limited thereto.

A directional antenna 12 disposed on the mobile vehicle 1. The directional antenna 12 can establish data connection with a base station 3.

A photographic element 13 is disposed on the mobile vehicle 1, and the photographic element 13 is positioned at a side of the directional antenna 12. The photographic element 12 includes a photographic part 131 and an image receiving processing part 132. The photographic part 131 is disposed on the mobile vehicle 1, and the image receiving processing part 132 is disposed at a side of the photographic part 131 for receiving an image captured by the photographic part 131. In one embodiment, the photographic element 13 is a camera, and the control device 2 can display the image on the image receiving processing part 132. The image receiving processing part 132 can be a display screen of the camera, but the present disclosure is not limited thereto. Alternatively, image receiving processing part 132 can be a circuit for processing the image.

An epipolar line analysis component 14 is disposed on the mobile vehicle 1. The epipolar line analysis component 14 includes a signal receiving element 141, an image receiving element 142 and an analyzing element 143. The signal receiving element 141 is disposed on the mobile vehicle 1 for data connection with the directional antenna 12 so as to get the signal strength received through the directional antenna 12 from the base station 3. The image receiving element 142 is disposed at a side of the signal receiving element 141 for data connection with the photographic element 13 so as to receive the image captured by the photographic element 13. The analyzing element 143 is disposed at a side of the image receiving element 142, and the analyzing element 143 establishes data connection with the signal receiving element 141 and the image receiving element 142. In one embodiment, the epipolar line analysis component 14 can be a circuit board disposed on the mobile vehicle 1, and the signal receiving element 141, the image receiving element 142 and the analyzing element 143 are electronic components or circuits on the circuit board.

An antenna adjustment method of for a mobile vehicle includes steps as follow.

(a) The mobile vehicle having a directional antenna and a photographic element is used to align a connectable base station at a short distance for optimal connection efficiency, record the distance between the mobile carrier and the base station, and capture the image of the base station at that position through the shooting unit in the photographic element.

(b) The mobile vehicle is moved gradually away from the base station when the directional antenna establishes data connection with the base station.

(c) During the mobile vehicle gradually moves away from the base station, recording two positions indicating optimal signals for two distances between the directional antenna and the base station, and using a photographic part of the photographic element to capture two corresponding images of the base station.

(d) The three images of the base station found in step (a) and step (c) for optimal connection efficiency are transmitted to an epipolar line analysis component on the mobile vehicle, the epipolar line analysis component is configured to analyze the three images so as to fit an epipolar line in a reference image. The epipolar line gives preferred image locations of base station of optimal connection efficiency for various distances of the directional antenna from the base station. The epipolar line is then transmitted to an image receiving processing part of the photographic element.

(e) When the directional antenna needs to achieve optimal connection efficiency from a specific distance to the base station, the mobile vehicle is reoriented to adjust image of the base station captured by the image receiving processing part to a designated location on the epipolar line, so that the directional antenna is properly pointed toward the base station for the optimal connection efficiency.

In above step (a) and step (b), the user can move the mobile vehicle 1 close to the base station 3, and align the directional antenna 12 to the base station 3, so that directional antenna 12 establishes optimal data connection with the base station 3. Then, the control device 2 controls the mobile vehicle 1 to move gradually away from the base station 3.

In above step (a) to step (d), as shown in FIGS. 4 to 9 with the structure of FIG. 1, three positions indicating optimal signals on three distances between the directional antenna 12 and the base station 3 are searched, and these signals are transmitted to the signal receiving element 141. For example, three positions indicating optimal signals are found on 25 meters, 50 meters and 75 meters. The photographic part 131 of the photographic element 13 is used to capture three images of the base station 3 at three positions of the reference image.

Since the direction and angle of the photographic element 13 on the mobile vehicle 1 are fixed. For example, the image of the base station 3 captured by the mobile vehicle 1 in position as FIG. 4 in the same direction, and therefore the image displayed by the image receiving processing part 132 is the same as FIG. 5. The images corresponding with the three positions are transmitted to the analyzing element 143. The analyzing element 143 is based on the signals received from the signal receiving element 141 to ensure the three positions corresponding to strongest signals. An epipolar line L with optimal connection efficiency can be analyzed on the basis of connecting the positions of the base station 3 in the reference image, and the epipolar line is transmitted to the image receiving processing part 132.

Figure 10:
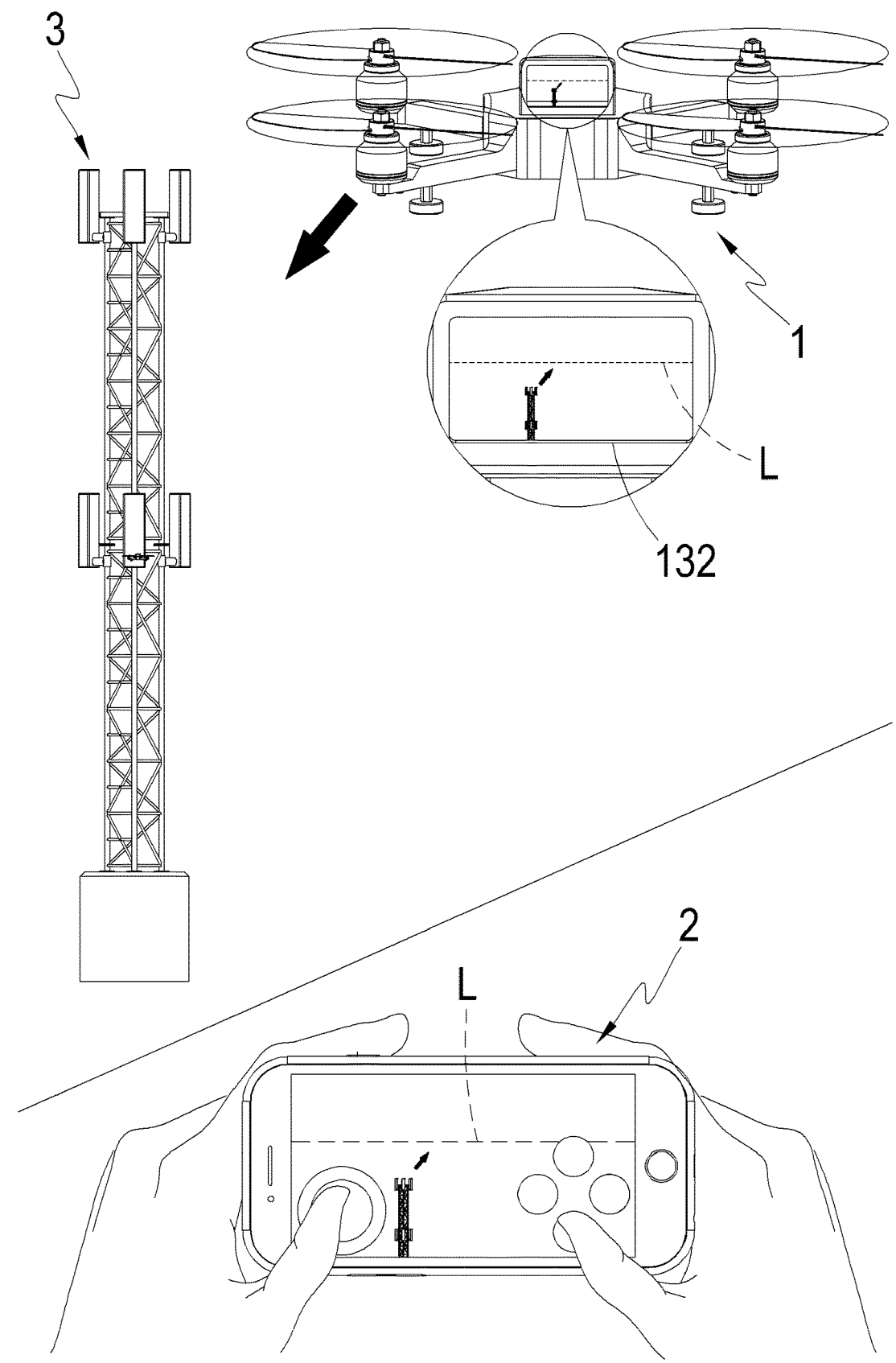
FIG. 10 is a schematic diagram (4) of an adjustment of one embodiment of the present disclosure.
Figure 11:
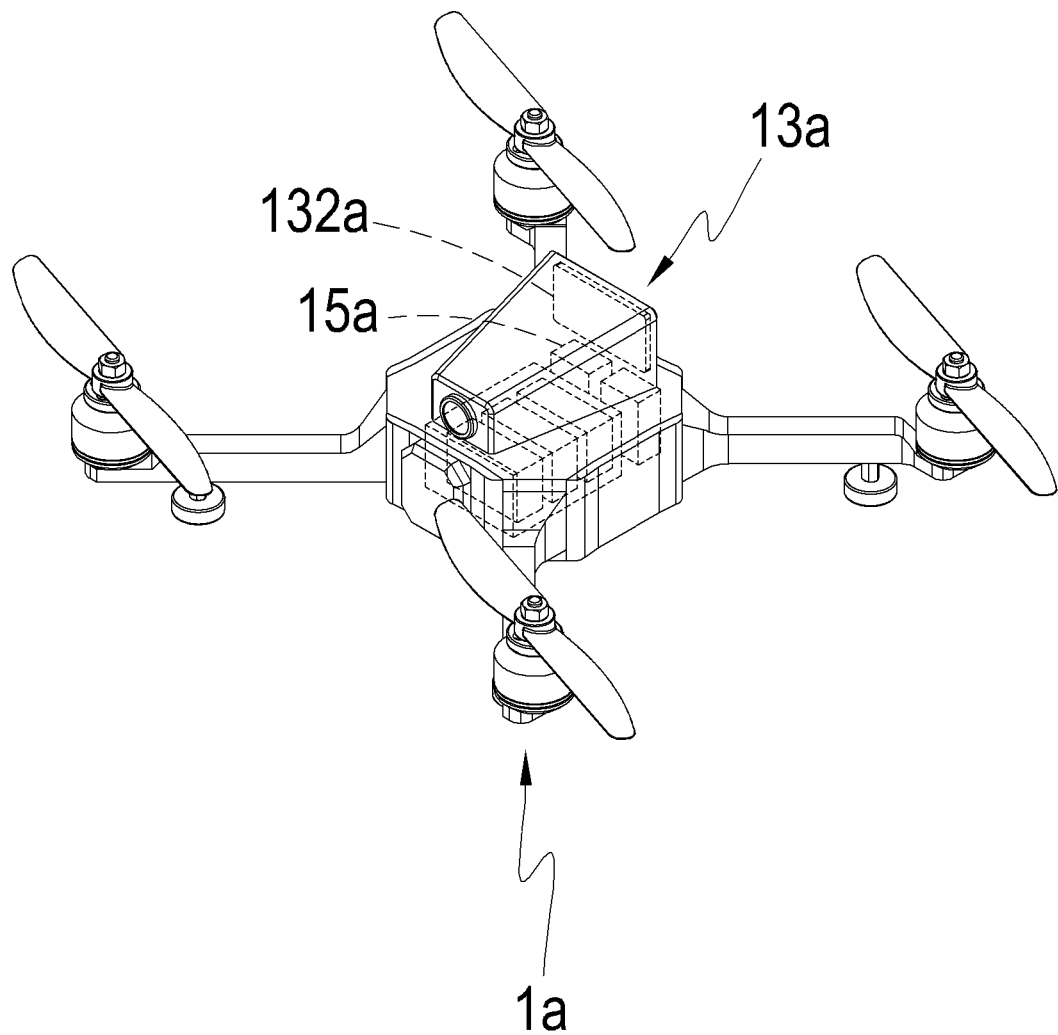
FIG. 11 is a perspective view of another embodiment of the present disclosure.
Figure 12:
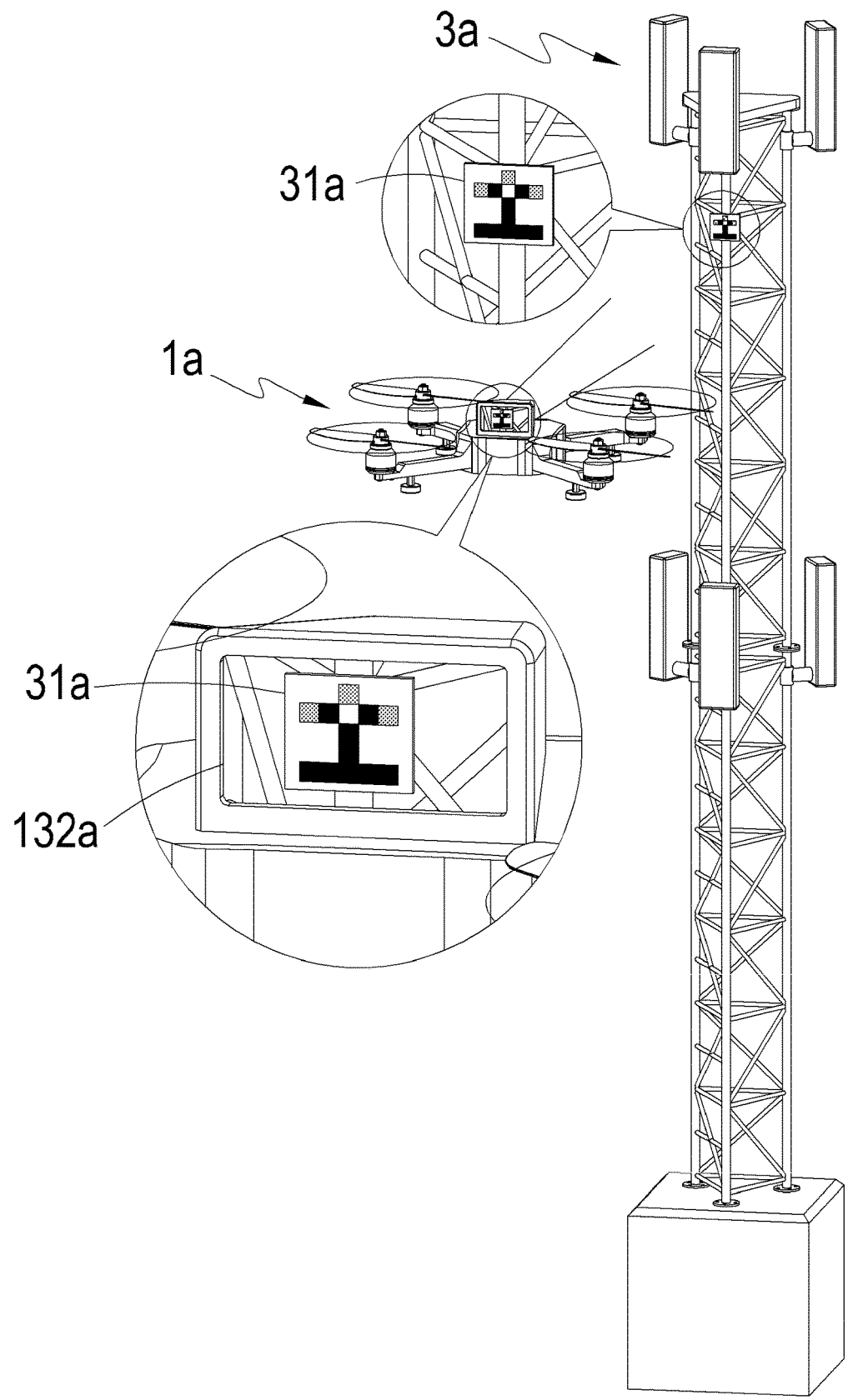
FIG. 12 is a schematic diagram (1) of an adjustment of another embodiment of the present disclosure.
Figure 13:
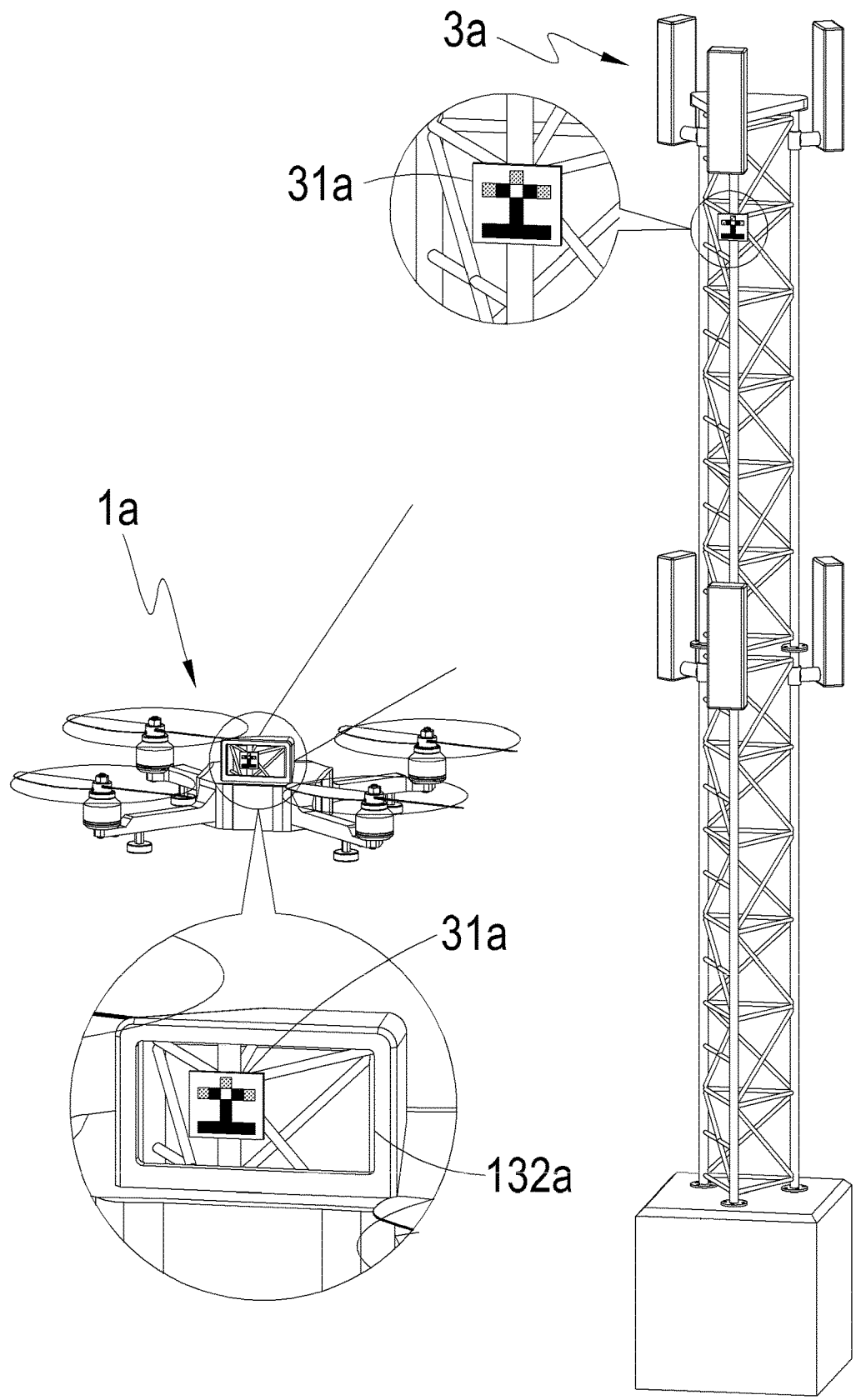
FIG. 13 is a schematic diagram (2) of an adjustment of another embodiment of the present disclosure.
Figure 14:
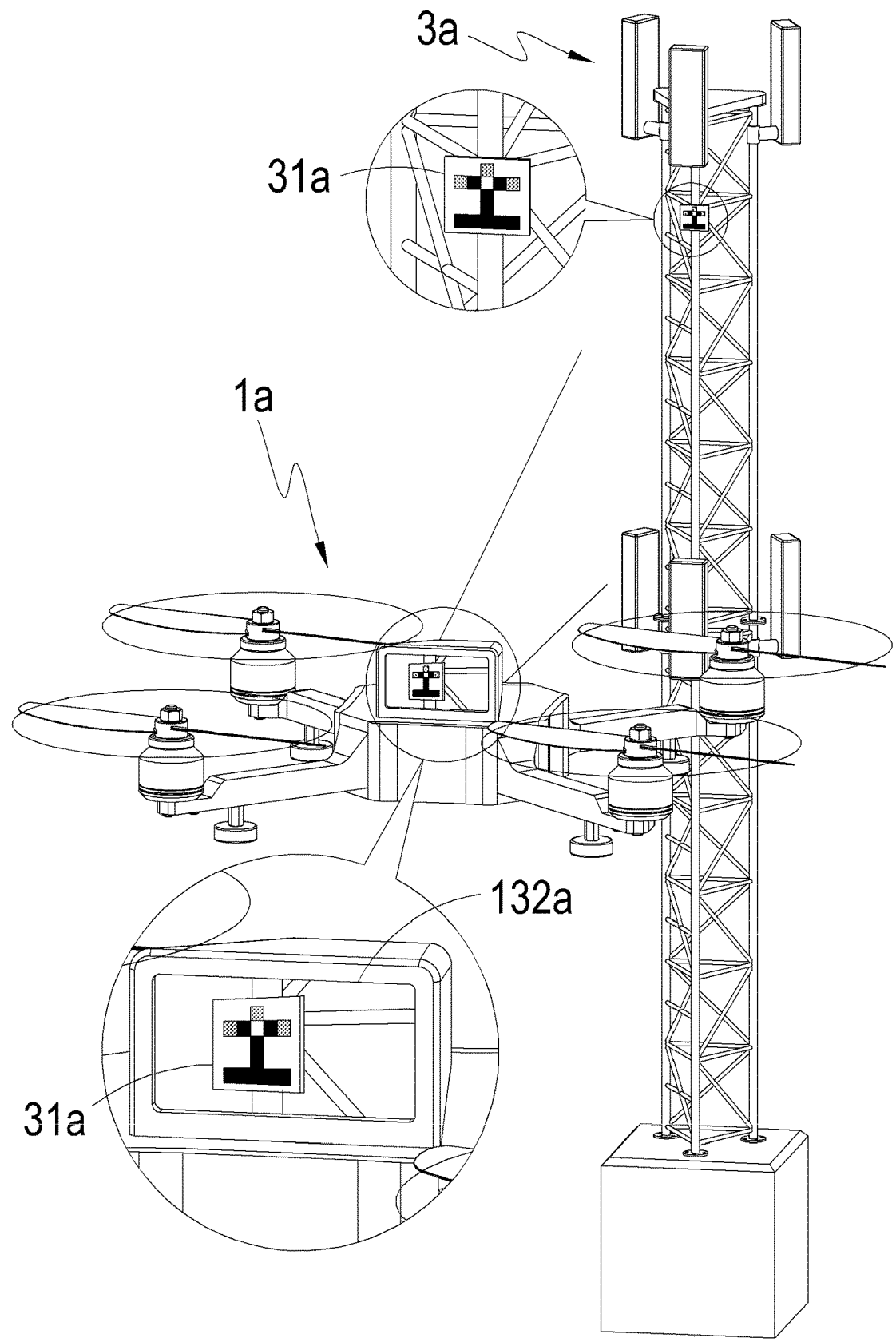
FIG. 14 is a schematic diagram (3) of an adjustment of another embodiment of the present disclosure.

In above step (e), as shown in FIG. 10, when the user needs the optimal connection efficiency between the mobile vehicle 1 and the base station 3 at a specific distance, the user can operate the control device 2 to move the mobile vehicle 1, so as to adjust the position of the base station 3 in the image of the image receiving processing part 132 to the location along the epipolar line L and find the pixel position corresponding to the optimal connection efficiency. Thus, the optimal connection efficiency is established between the directional antenna 12 and the base station 3. The aforesaid method of the present disclosure does not need large energy to search the base station 3 by frequency sweeping, and can quickly move the mobile vehicle 1 to the epipolar line L with the optimal connection efficiency, thereby improving the overall system efficiency. In this embodiment, the manner of moving the mobile vehicle 1 to the optimal connection position is controlled by the control device 2, but the present disclosure is not limited thereto. Alternatively, the software of the mobile vehicle 1 to scan the position of the base station 3 in the image on the image receiving processing part 132, so as to adjust the movement.

Referring to FIGS. 11 to 14, they show a perspective view to a schematic diagram (3) of an adjustment of another embodiment of the present disclosure. As shown in these figures, the present embodiment is substantially the same as the above embodiment, except that the base station 3 has a positioning picture 31a. The positioning picture 31a consists of a plurality of color squares. The mobile vehicle 1a is provided with an image analyzing component 15a. The image analyzing component 15a can analyze the image of the positioning picture captured by the photographic element 13a, so as to determine the distance and angle between the mobile vehicle 1a and the base station 3a. For example, when the mobile vehicle 1a faces the base station 3a and the distance is 10 meters, the length of the upper side of the positioning image 31a as shown in the image receiving processing part 132a is 25 pixels; when the mobile vehicle 1a faces the base station 3a and the distance is 50 meters, the length of the upper side of the positioning image 31a as shown in the image receiving processing part 132a is 15 pixels. Thus, the distance between the mobile vehicle 1a and the base station 3a can be calculated. When the mobile vehicle 1a faces the base station 3a in the same distance, the length of the left side of the positioning image 31a as shown in the image receiving processing part 132a is 20 pixels; when the mobile vehicle 1a is moved to the right at 45 degrees in the same distance, the length of the left side of the positioning image 31a as shown in the image receiving processing part 132a is 10 pixels. Based on the three distances and the corresponding pixel positions on the image obtained in step (d), the corresponding pixel position on the epipolar line L of the current distance is analyzed by the cross ratio function. When the center of the image 31a is aligned with this pixel position, the directional antenna 12 and the base station 3 can establish the optimal connection efficiency.

Figure 15:
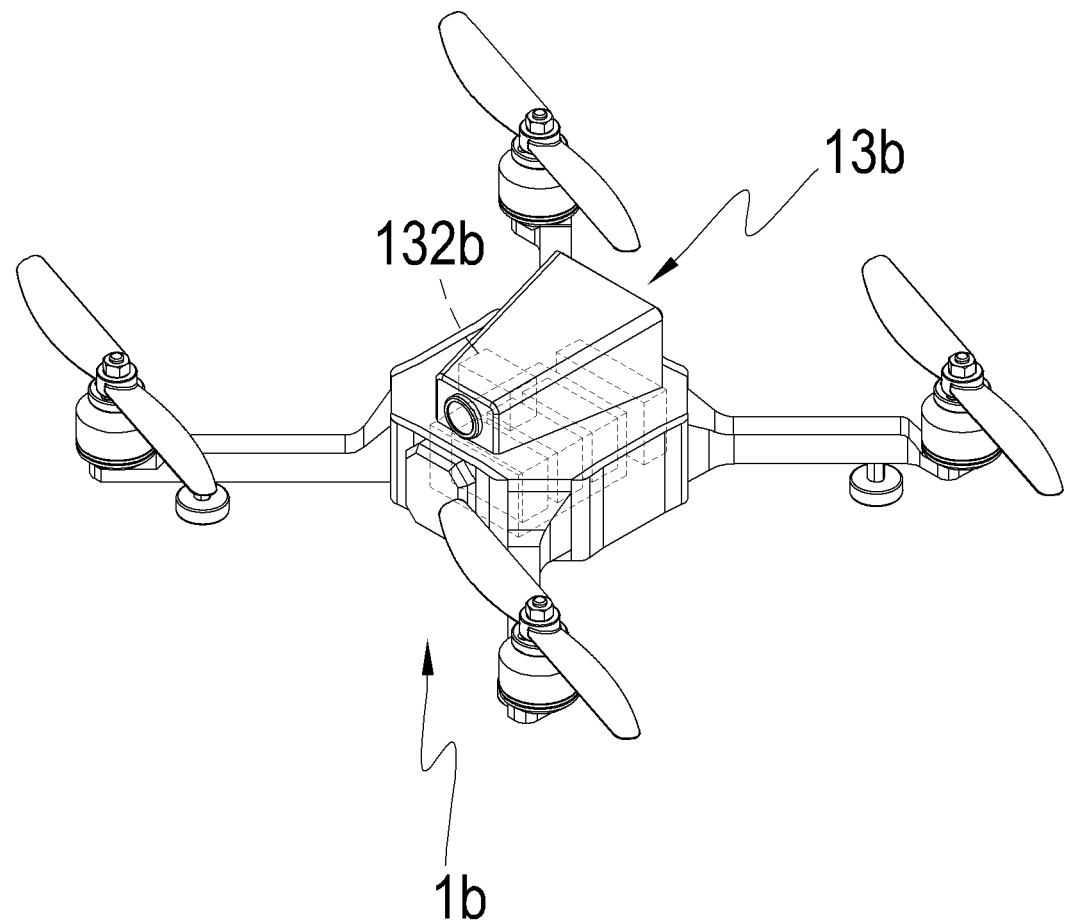
FIG. 15 is a perspective view of yet another embodiment of the present disclosure.
Figure 16:
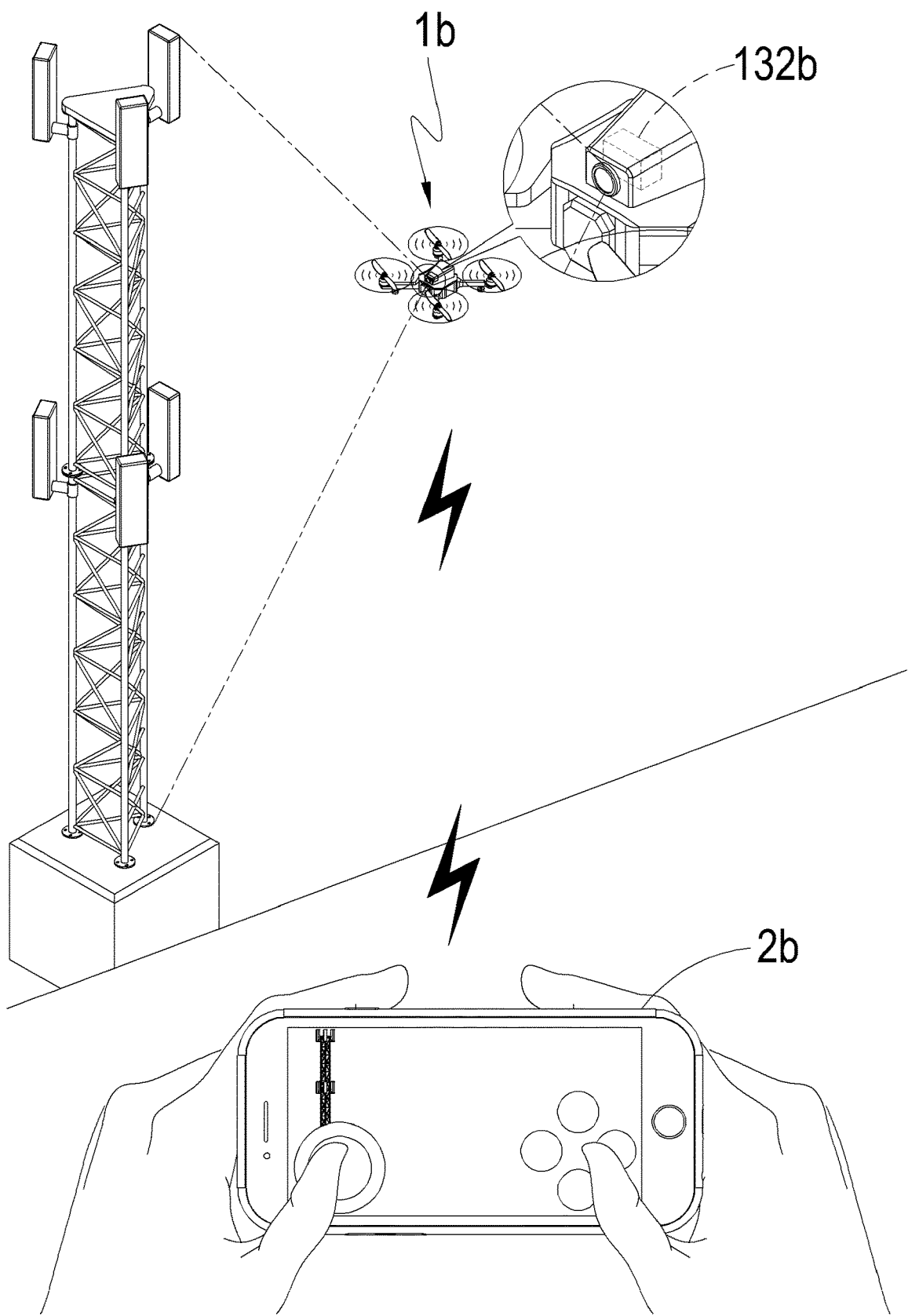
FIG. 16 is a schematic diagram of an adjustment of yet another embodiment of the present disclosure.

Referring to FIGS. 15 to 16, they show a perspective view to a schematic diagram of an adjustment of yet another embodiment of the present disclosure. As shown in these figures, the present embodiment is substantially the same as the above embodiment. In the present embodiment, the image receiving processing part 132b is a circuit in the photographic element 13b for processing the display image, and this circuit can access the image of the photographic element 13b, so as to indicate that the image receiving processing part 132b is not limited. After the image receiving processing part 132b receives the image, the user can see the image on the control device 2b so as to adjust the position of the mobile vehicle 1b.

Therefore, the key of the antenna adjustment device and method for the mobile vehicle of the present disclosure to improve the conventional art is described as follow.

1. The photographic element 13 is coupled to the epipolar line analysis component 14 to quickly and conveniently adjust the optimal connection position of the directional antenna 12 disposed on the mobile carrier 1 to the base station 2.

2. The positioning image 31a is used to increase the convenience in assisting adjustment and correction and to reduce the energy loss.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An antenna adjustment device for a mobile vehicle, comprising:
    the mobile vehicle;
    a directional antenna disposed on the mobile vehicle for data connection with a base station;
    a photographic element disposed on the mobile vehicle and positioned at a side of the directional antenna, and the photographic element comprising a photographic part and an image receiving processing part, the photographic part disposed on the mobile vehicle, and the image receiving processing part disposed at a side of the photographic part for receiving an image captured by the photographic part; and
    an epipolar line analysis component disposed on the mobile vehicle for data connection with the directional antenna and the photographic element, and the epipolar line analysis component configured to generate an epipolar line for an optimal connection efficiency based on the image of the base station captured by the photographic element and a signal strength received by the directional antenna when the mobile vehicle positioned corresponding to the image.

2. The antenna adjustment device for the mobile vehicle of claim 1, wherein the epipolar line analysis component comprises a signal receiving element, an image receiving element and an analyzing element, the signal receiving element is disposed on the mobile vehicle for data connection with the directional antenna so as to get the signal strength received by the directional antenna, the image receiving element is disposed at a side of the signal receiving element for data connection with the photographic element so as to receive the image captured by the photographic element, and the analyzing element is disposed at a side of the image receiving element for data connection with the signal receiving element and the image receiving element so as to analyze the epipolar line with the optimal connection efficiency.

3. The antenna adjustment device for the mobile vehicle of claim 1, wherein the base station has a positioning picture.

4. The antenna adjustment device for the mobile vehicle of claim 3, wherein the positioning picture consists of a plurality of color squares.

5. The antenna adjustment device of the mobile vehicle of claim 3, wherein the mobile vehicle is provided with an image analyzing component for analyzing the image of the positioning picture captured by the photographic element, so as to get a distance and an angle between the mobile vehicle and the epipolar line.

6. An antenna adjustment method of for a mobile vehicle, comprising steps of:

(a) using the mobile vehicle having a directional antenna and a photographic element to align a connectable base station at a short distance for optimal connection efficiency, record the distance between the mobile carrier and the base station, and capture the image of the base station at that position through a shooting unit in the photographic element;

(b) moving the mobile vehicle gradually away from the base station when the directional antenna establishes data connection with the base station;

(c) during the mobile vehicle gradually moves away from the base station, recording two positions indicating optimal signals for two distances between the directional antenna and the base station, and using a photographic part of the photographic element to capture two corresponding images of the base station;

(d) transmitting the three images of the base station found in step (a) and step (c) for optimal connection efficiency to an epipolar line analysis component on the mobile vehicle, the epipolar line analysis component configured to analyze the three images so as to generate an epipolar line in a reference image, and transmitting the epipolar line to an image receiving processing part of the photographic element; and (e) when the directional antenna needs to achieve optimal connection efficiency from a specific distance to the base station, reorient the mobile vehicle to adjust image of the base station captured by the image receiving processing part to a designated location on the epipolar line, so that the directional antenna is properly pointed toward the base station for the optimal connection efficiency.

7. The antenna adjustment method for the mobile vehicle of claim 6, wherein the epipolar line analysis component comprises a signal receiving element, an image receiving element and an analyzing element, the signal receiving element is disposed on the mobile vehicle for data connection with the directional antenna so as to get the signal strength received by the directional antenna, the image receiving element is disposed at a side of the signal receiving element for data connection with the photographic element so as to receive the image captured by the photographic element, and the analyzing element is disposed at a side of the image receiving element for data connection with the signal receiving element and the image receiving element so as to analyze the epipolar line with the optimal connection efficiency.

8. The antenna adjustment method for the mobile vehicle of claim 6, wherein the base station has a positioning picture.

9. The antenna adjustment method for the mobile vehicle of claim 8, wherein the positioning picture consists of a plurality of color squares.

10. The antenna adjustment method for the mobile vehicle of claim 8, wherein the mobile vehicle is provided with an image analyzing component for analyzing the image of the positioning picture captured by the photographic element, so that after an image of the positioning picture of the base station captured by the photographic part moves to a designated location on the epipolar line according to the distance between the antenna and the base station calculated by the image analyzing component, the optimal connection efficiency is achieved.

* * * * *